Figure 1:
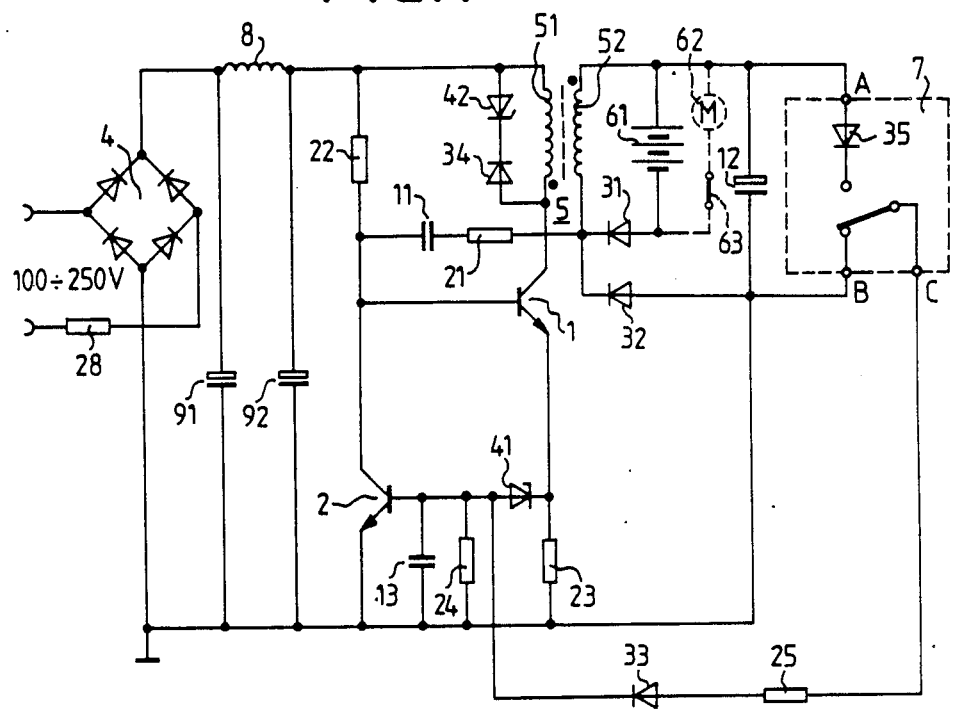

United States Patent [19]

Schwarz

[11] Patent Number: 4,706,009
[45] Date of Patent: Nov. 10, 1987

[54] ELECTRONIC SWITCHING POWER SUPPLY

[75] Inventor: Gerhard Schwarz, Altena, Fed. Rep. of Germany

[73] Assignee: Braun Aktiengesellschaft, Kronberg, Taunus, Fed. Rep. of Germany

[21] Appl. No.: 941,920

[22] Filed: Dec. 15, 1986

[30] Foreign Application Priority Data

Dec. 20, 1985 [DE] Fed. Rep. of Germany ....... 3545324

[51] Int. Cl.⁴ .............................................. H02J 7/00
[52] U.S. Cl. ...................................... 320/22; 320/35; 320/39; 320/46
[58] Field of Search ...................... 320/22, 23, 35, 39, 320/46

[56] References Cited

U.S. PATENT DOCUMENTS

| | | | |
|---|---|---|---|
| 4,441,147 | 4/1984 | Schwarz ................................ | 363/21 |
| 4,464,619 | 8/1984 | Schwarz et al. ...................... | 320/40 |
| 4,523,139 | 6/1985 | Schwarz et al. ...................... | 320/40 |
| 4,614,905 | 9/1986 | Peterson et al. ...................... | 320/23 |

Primary Examiner—Patrick R. Salce
Assistant Examiner—Anita M. Ault
Attorney, Agent, or Firm—Raymond J. De Vellis

[57] ABSTRACT

The invention is directed to an electronic switching power supply for the controlled charging of a storage battery (61) with a boost- or trickle-charge current in dependence upon the charge condition of the battery, including a primary-pulsed blocking oscillator type converter in which the primary coil (51) of a transformer (5) is connected in series with a switching transistor (1) while its secondary coil (52) is connected in series with the storage battery (61) and a diode (31). Provided in parallel with the series connection comprising the storage battery (61) and the diode (31) are a capacitor (12) and a further diode (32) connected in series, with a switching arrangement (71) provided in parallel with the capacitor (12) being connected via a decoupling arrangement to the base of a second transistor (2) determining the turn-on period of the first transistor (1). The switching arrangement (7) operates in dependence upon the cell voltage, the cell temperature or the internal gas pressure of the storage battery, causing the electronic switching power supply to switch from a high boost-charge current to a low trickle-charge current.

8 Claims, 4 Drawing Figures

ELECTRONIC SWITCHING POWER SUPPLY

DESCRIPTION

This invention relates to an electronic switching power supply for charging a storage battery or accumulator from an AC or DC voltage source of different voltage levels, including a primary-pulsed blocking oscillator type converter in which the primary coil of a transformer is connected in series with a first transistor while its secondary coil is connected in series with the storage battery and a first diode, with the base of the first transistor being connected, via a first capacitor and a first resistor connected in series, both to the one end of the secondary coil of the transformer, while the other coil end is connected to the storage battery, and, via a second resistor, to the one terminal of the input voltage source and to the collector of a second transistor having its emitter connected to reference potential, with the emitter of the first transistor connected both to reference potential via a third resistor and, via a zener diode, to the base of the second transistor connected to reference potential via a fourth resistor.

An electronic switching power supply of the type identified above is known from German published patent application DE-OS 3,218,594, which serves to boost and trickle charge a storage battery, preferably a nickelcadmium storage battery, in which the electronic switching power supply is basically provided for supplying a constant voltage and/or constant current to electrical or electronic devices and is configured as a primary-pulsed blocking oscillator type converter. In the known primary-pulsed B.O.-type converter, the primary coil of a transformer is connected in series with a switching transistor, while the secondary coil of the transformer is connected in series with an electrical load formed by a storage battery and an electric motor connected in parallel and a diode. In addition, the known electronic switching power supply includes a voltage comparator which is made up of two transistors including their associated circuitry and monitors the predetermined desired voltage value at the load, inhibiting conduction of the switching transistor of the B.O.-type converter when this desired value is reached. The high boost-charge current flowing when the battery charge is correspondingly low is thereby reduced to a low trickle-charge current when the voltage value set at the voltage comparator is attained. In this arrangement, the battery voltage is not measured while the high boost-charge current flows into the battery, but only at a low load, whereby measuring errors which are inevitable due to the battery internal resistance are avoided or reduced. The voltage reference circuitry necessary for switching from the boost-charge mode to the trickle-charge mode requires, however, an accurate adjustment in order not to adversely affect the storage battery by switching over too late. On the other hand, charging the storage battery to full capacity has to be ensured in the interest of a prolonged battery life. Accurate adjustment, however, also depends on the age of the battery and the change in the battery charging characteristics thereby involved, so that theoretically a continuous readjustment is necessary.

From EP-A-0 030 026, a circuit arrangement for the controlled supply of power to a load is known which can be operated at different DC or AC voltages as well as at different AC frequencies without the need to switch over. This known circuit arrangement includes a blocking oscillator type converter which is controlled by means of two controllable semiconductor switches in dependence upon the current flowing through the primary coil of a transformer and in dependence upon the input voltage applied, such that the output power delivered is nearly constant. The load is comprised of a storage battery and a DC motor connected in parallel, the circuit arrangement thus supplying either the full motor output when mainsoperated or a charging current for the storage battery when the motor is turned off. With the DC motor turned off, the nickel-cadmium storage battery receives a boost charge at a high current. To avoid damage to the battery while being boost-charged, this known circuit arrangement provides a voltage-dependent switch which consists of a transistor having its collector connected via a resistor to the base of the switching transistor connected in series with the transformer, while its base-emitter circuit, which is in series with another resistor and a zener diode, is connected in parallel with the storage battery to be charged. If, during boost charging, the battery voltage exceeds the value predetermined by the zener diode, the transistor will switch on, thereby turning off the switching transistor connected in series with the transformer primary coil. In this circuit arrangement, the turn-on and turn-off times of the B.O.-type converter depend on the currents flowing through two different resistors, the difference between these two currents producing a hysteresis behavior. In this manner, the B.O.-type converter does not constantly switch back and forth between a turned-on and a turned-off state but requires the battery voltage to have dropped by a certain amount before the charging current is again turned on. As the B.O.-type converter is turned off, a light-emitting diode provided in the base circuit of the second transistor will be extinguished, thus indicating the termination of the charging process.

However, such a circuit arrangement for boost charging a storage battery by means of a primary-pulsed blocking oscillator type converter has a relatively low efficiency which is attributable to the required standby voltage for the electronic control means, in addition to constantly drawing current from the storage battery for operating the electronic control means when the plug is disconnected from the mains supply, that is, the device is energized solely by power supplied from the storage battery. Still further, such an arrangement necessitates a relatively high complexity of components.

It is accordingly an object of the present invention to provide an electronic switching power supply for charging a storage battery from an AC or DC voltage source of different voltage levels, which turns the charging current on and off practically without losses and which does not consume energy when disconnected from the supply voltage.

According to the present invention, this object is achieved by providing a second capacitor and a rectifier in series, which are connected in parallel with the secondary coil of the transformer and have their junction connected to reference potential, and by providing, in parallel with the second capacitor, a switching arrangement connecting either the terminal of the second capacitor connected to the secondary coil of the transformer or the terminal of the second capacitor connected to reference potential with the base of the second transistor via a decoupling arrangement.

The solution of the invention ensures that no energy is consumed with the switching power supply turned off, because the storage battery is disconnected from the switching arrangement, preventing it from being discharged.

In an advantageous embodiment of the solution of the invention, the switching arrangement connects the decoupling arrangement to reference potential with the switching power supply turned off. It is thereby ensured that, following activation of the switching power supply, the B.O.-type converter will immediately oscillate continuously and a high charging current will flow.

In another advantageous embodiment, the switching arrangement is comprised of an auxiliary voltage circuit to which the battery voltage is applied and which operates in dependence on the charging characteristics of the storage battery when the storage battery has reached its fully charged condition.

This embodiment makes it possible for a storage battery, for example, a nickel-cadmium storage battery, to reach a fully charged condition with a constant charging current, independent of the age and changes in the charging characteristics of the battery.

In an advantageous improvement of the invention, the switching arrangement is comprised of a self-holding thermal circuit breaker responsive to the cell temperature of the storage battery and switching in dependence on the charging characteristics of the storage battery when it has reached its fully charged condition.

This improvement ensures full charging of the storage battery with a constant charging current, independent of age and changes in the charging characteristics of the storage battery and without the risk of external influences such as voltage increases or voltage peaks that may occur jeopardizing the attainment of a fully charged condition. Moreover, switching from a high boost-charge current to a low trickle-charge current and vice versa is ensured without any adjustment of the switching power supply.

Further advantageous embodiments of the invention will become apparent from the other subclaims.

Figure 2:
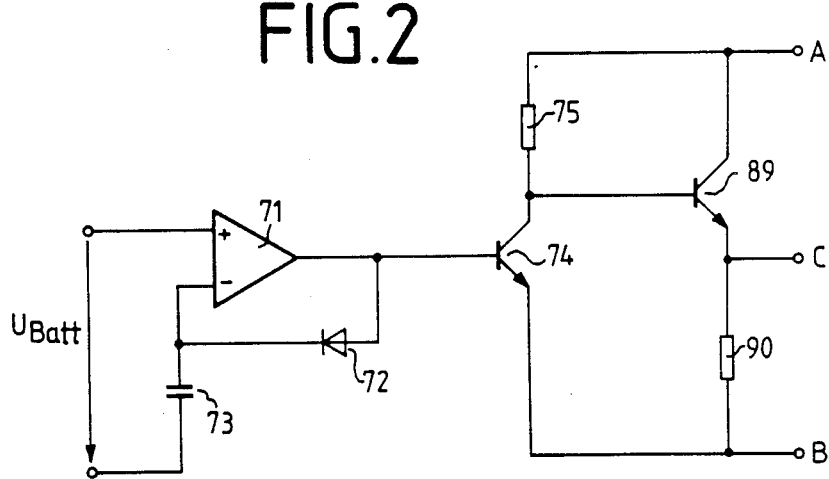
Figure 3:
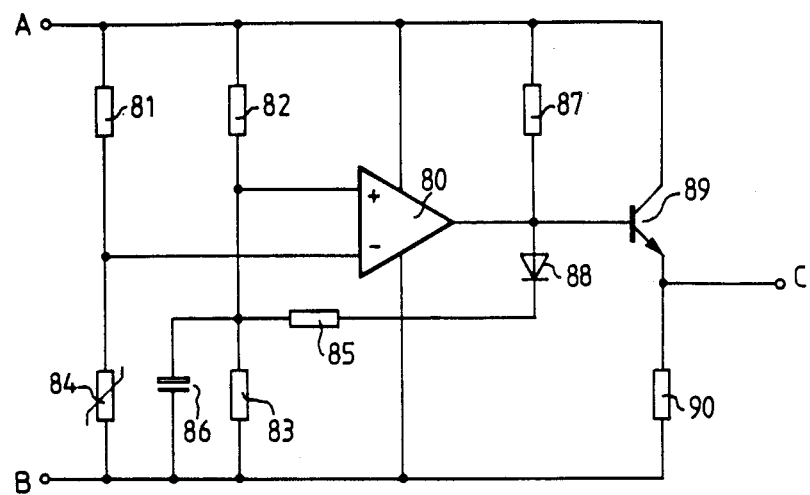
Figure 4:
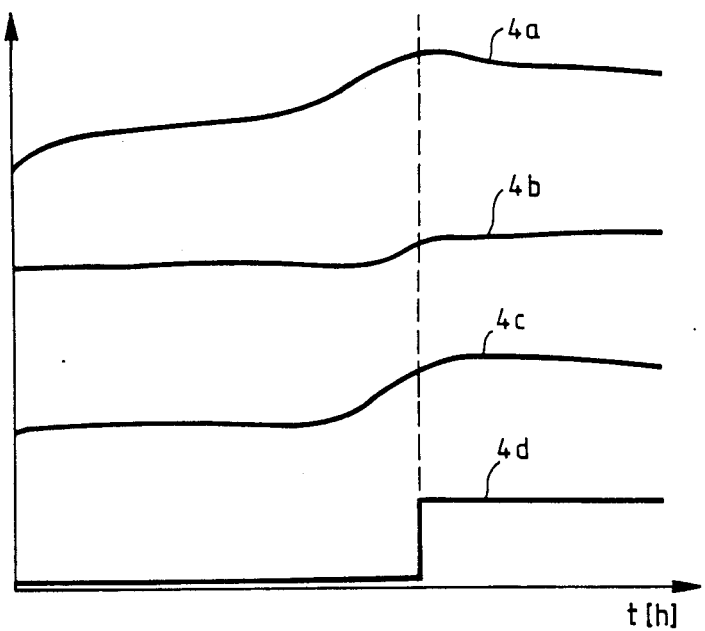

The idea underlying the invention shall be explained in more detail in the following with reference to embodiments shown in the drawing. In the drawing, FIG. 1 is a circuit diagram of an electronic switching power supply including electronic control means for boostcharging a storage battery, with automatic switching to a trickle-charge mode, FIG. 2 is a circuit schematic of a switching arrangement of FIG. 1, wherein switching occurs in dependence upon the cell voltage;

FIG. 3 is a circuit configuration of the switching arrangement of FIG. 1, wherein switching occurs in dependence upon the cell temperature; and FIG. 4 is a graph showing the charging characteristics of a storage battery and the switching operation plotted against time.

The electronic switching power supply illustrated in FIG. 1 includes a primary-pulsed blocking oscillator type converter having a transformer 5 and a first transistor 1 as well as a first diode 31 provided in the load circuit and being of such polarity that the energy stored in the transformer 5 during the off period of the first transistor 1 is discharged to the load 6 comprised of a storage battery 61 and a DC motor 62 adapted to be connected to the battery 61 via a switch 63. The B.O.-type converter is energized, via a bridge rectifier 4 and a resistor 28, from a DC or AC supply the voltage of which is between 100 and 250 volts, in extreme cases also 12 volts, and the frequency of which may be nearly arbitrary where an AC supply is used. The rectified output voltage is applied to the input of the B.O.-type converter or to the electronic control means via a filtering and smoothing circuitry comprised of a choke 8 and two smoothing capacitors 91, 92.

Connected in parallel with the DC terminals is the primary coil 51 of the transformer 5 in series with the collector-emitter circuit of the first transistor 1. The base of the first transistor 1 is connected to the one terminal of the secondary coil 52 of the transformer 5 via a first capacitor 11 in series with a first resistor 21 and, via a second resistor 22 and the choke 8, to the positive pole of the input voltage terminal. In addition, the base of the first transistor 1 is also connected to ground or reference potential via the collector-emitter circuit of a second transistor 2.

The emitter of the first transistor 1 is connected to the cathode of a first zener diode 41 having its anode connected both to the base of the second transistor 2 and, via a fourth resistor 24 in parallel with a further capacitor 13, to ground or reference potential. In addition, the emitter of the first transistor 1 is connected to ground or reference potential via a third resistor 23.

The direction of winding of the primary and secondary coil 51 and 52, respectively, of the transformer 5 is determined by the dots shown in the drawing.

Connected in parallel with the secondary coil 52 of the transformer 5 is the storage battery 61 in series with the first diode 31 as well as a second capacitor 12 in series with a second diode 32 having their junction connected to ground or reference potential.

The second capacitor 12 is connected to the terminals A and B of a switching arrangement 7 having its third terminal C connected to the junction of the anode of the zener diode 41 and the base of the second transistor 2 via a fifth resistor 25 in series with a third diode 33, the cathode of the third diode 33 being connected to the anode of the zener diode 41. The switching arrangement 7 is configured such that the third terminal C connects with either terminal A or terminal B, with terminal A being adapted to be connected to terminal C via a further diode 35.

The mode of operation of the electronic switching power supply of FIG. 1 shall be explained in more detail in the following.

Following rectification of the DC or AC voltage applied to the input of the bridge rectifier 4 and its subsequent filtering and smoothing by means of the choke 8 and the capacitors 91, 92, respectively, a low base current will drive the first transistor 1, which operates as a switching transistor, via the second resistor 22, placing the first transistor 1 in its conductive state. Through the circuit path between the first transistor 1 and the primary coil 51 of the transformer 5, a positive feedback effect is produced feeding an additional drive current to the first transistor 1, rendering it fully conducting instantly. The collector current rises linearly, producing a voltage proportional to that current at the third resistor 23. When the collector current or the proportional voltage have reached a predetermined peak value, the second transistor will be driven via the zener diode 41, thereby going into conduction and connecting the base of the first transistor 1 to ground or reference potential, whereby base current is withdrawn from the first transistor 1, cutting it off.

With the beginning of the off period of the first transistor 1, the voltage induced in the secondary coil 52 of the transformer 5 will change its polarity. The energy stored in the transformer 5 will thus be delivered to the storage battery 61 via the first diode 31 in accordance with the operating principle of a B.O.-type converter.

During the reversal process of the transformer 5, the diode 34 in series with the zener diode 42 which are connected in parallel with the primary coil 51 of the transformer 5 will limit the switch-back voltage peak during the off period of the first transistor 1, the diode 34 and the zener diode 42 having either their cathodes or their anodes interconnected.

With the first transistor 1 conducting, the first capacitor 11 is charged via the first resistor 21 while, with the first transistor 1 switched off, the charge is reversed such as to produce a positive voltage at its electrode connected to the base of the first transistor 1 which ensures even at a very low operating voltage of, for example, 12 volts, that the first transistor 1 is switched on again instantly when the second transistor 2 is off following termination of the transformer discharge phase, thereby bringing the first transistor 1 into conduction.

In the switch position of the switching arrangement 7 shown in FIG. 1 in which the decoupling arrangement consisting of diode 33 and resistor 25 is connected to reference potential, the storage battery 61 receives a boost charge, with the battery charging current being determined by the peak current on the primary side and by the inductance of the transformer. The voltage at the second capacitor 12 is as follows:

$$U_{CSL} = U_{Batt} + U_{f31} - U_{f32},$$

where $U_{Batt}$ is the voltage at the storage battery 61, $U_{f31}$ is the forward voltage drop across the first diode 31, and $U_{f32}$ is the forward voltage drop across the second diode 32. With the switching arrangement 7 in this position, the storage battery 61 receives a boost-charge current.

In the opposite switch position of switching arrangement 7, the storage battery 61 is charged with a trickle-charge current, with the voltage at the second capacitor 12 being as follows:

$$U_{CEL} = U_{BET2} \cdot \frac{R_{24} + R_{25}}{R_{24}} U_{f33} + U_{f35} \approx 2.6 \text{ volts},$$

where $U_{BET2}$ is the base-emitter voltage drop across the second transistor, $R_{24}$ is the resistance of the fourth resistor 24, $R_{25}$ is the resistance of the fifth resistor 25, $U_{f33}$ is the voltage drop across the third diode 33, and $U_{f35}$ is the forward voltage drop across the fifth diode 35.

As a result of the two equations identified above, a charging current will flow to the storage battery 61 whenever the sum of the voltages $U_{CEL}$ at the second capacitor and $U_{f32}$ is greater than the sum of the battery voltage $U_{Batt}$ and the forward voltage drop $U_{f31}$ across the first diode 31. During trickle charging, the charging current is thus significantly reduced compared to the charging current during boost charging. However, a voltage will be available at the second capacitor 12 in either switch position of the switching arrangement 7.

With the B.O.-type converter oscillating, the first transistor 1 will invariably go into conduction when the base voltage of the second transistor 2 drops below a value predetermined by the zener diode 41, so that the second transistor 2 is cut off during discharge of the transformer 5, bringing the first transistor 1 into conduction via the second resistor 22 supported by the suitably reversed charge in the first capacitor 11.

Various embodiments of the switching arrangement 7 considering the individual charging conditions of the storage battery 61 shall now be explained in more detail with reference to FIGS. 2 and 3.

The embodiment of FIG. 2 shows a switching arrangement sensing the cell voltage of the storage battery 61 and switching over when the cell voltage has reached a predetermined value. It comprises a differential amplifier 71 having the upper terminal of the storage battery 61 applied to its positive input while the negative input is connected to the lower terminal of the storage battery 61 through a third capacitor 73 and, via a fourth diode 72, to its output, with the anode of the fourth diode 72 being connected to the output of the differential amplifier 71.

The output of the differential amplifier 71 is connected to the base of a third transistor 74 having its collector connected to the base of a fourth transistor 89 and, via a sixth resistor 75, to the collector of the fourth transistor 89, forming the terminal A of FIG. 1. The emitter of transistor 89 forming the terminal C of FIG. 1 is connected via a resistor 90 to ground or reference potential forming terminal B.

The mode of operation of the arrangement of FIG. 2 shall now be explained in conjunction with the representation of FIG. 4.

FIG. 4 shows the charging characteristics of, for example, a nickel-cadmium storage battery which is to be charged with a preferably constant or nearly constant charging current. FIG. 4 shows the cell voltage (curve 4a), the cell temperature (curve 4b), and the internal gas pressure (curve 4c) of a nickel-cadmium storage battery, plotted against the charging time t. It is to be considered that both the cell voltage and the cell temperature and the internal gas pressure may vary during the charging process in dependence upon the charging current and the ambient temperature. The amplitudes of characteristic curves 4a, 4b and 4c may also vary with the age of the battery, the shape of the curve, that is, in particular the distinctive maximum thereof, remaining however unchanged.

As becomes apparent from the characteristic curve 4a of FIG. 4, the cell voltage shows a brief distinctive maximum when the fully charged condition is reached, subsequently dropping to a value which is higher than the value prevailing prior to the fully charged condition. This distinctive maximum is made use of in the switching arrangement of FIG. 2 which, in its proper sense, is to be considered as a peak voltmeter reversing its state on attainment of the maximum as reflected in characteristic curve 4d, since with the voltage decreasing at the positive input of the comparator 71 the voltage present at the charged third capacitor 73 will prevail, causing the comparator output to change its state.

The embodiment of the switching arrangement 7 shown in FIG. 3 represents a self-holding thermal circuit breaker utilizing the variation of the cell temperature of a storage battery when it reaches its fully charged condition.

The self-holding thermal circuit breaker of FIG. 3 includes a first voltage divider connected in parallel with the second capacitor 12 and comprised of a first voltage-dividing resistor 81 and a thermally sensitive resistor 84 thermally connected to the storage battery 61, as well as a second voltage divider likewise connected in parallel with the second capacitor 12 and comprised of a second voltage-dividing resistor 82 in series with a third voltage-dividing resistor 83. The first voltage-dividing resistor is connected to the negative input of a comparator 80 while the second voltage divider is connected to the positive input of comparator 80.

The output of comparator 80 is connected to the positive input of comparator 80 via a diode 88 and a resistor 85, with a capacitor 86 being connected in parallel with the third voltage-dividing resistor 83. In addition, the output of comparator 80 is connected to the base of a transistor 89 whose collector forms the terminal A of FIG. 1 while its emitter forms the terminal C of FIG. 1. The emitter of transistor 89 is further connected to ground or reference potential via a resistor 90, thus forming the terminal B of FIG. 1. Another resistor 87 is connected in parallel with the base-collector circuit of transistor 89.

The self-holding thermal circuit breaker shown in FIG. 3 is configured in such a manner that the comparator output will go to a high voltage level when the cell temperature exceeds a predetermined value, a low tolerance of the switching temperature being ensured without adjustment. If the comparator 80 is connected to the operating voltage, the voltage at the non-inverting input of comparator 80 will continue to be lower than the voltage at its inverting input until the second capacitor 12 is charged. The comparator output thus switches to a low voltage level. Provided that the resistance of the first voltage-dividing resistor 81 is equal to the resistance of the second voltage-dividing resistor 82, the output of comparator 80 will remain low until the resistance of the thermally sensitive resistor 84 is greater than the resistance of the third voltage-dividing resistor 83.

If, with the cell temperature of the storage battery 61 rising, the resistance of the thermally sensitive (NTC) resistor 84 becomes smaller than the resistance of the third voltage-dividing resistor 83, the comparator output will switch to a high voltage level, causing the resistor 85 in series with the diode 88 to be connected in parallel with the second voltage-dividing resistor 82, with the output of comparator 80 remaining high as long as required by the thermally sensitive resistor 84 to return to high impedance due to its cooling down. It is thereby ensured that the cell temperature plotted against the charging time as shown in characteristic curve 4b of FIG. 4 is taken into consideration accurately with a low tolerance of the switching temperature and without adjustment of the electronic switching power supply, causing the electronic switching power supply to switch over suitably when the temperature increase occurs at the time of the fully charged condition.

In summary, the switching arrangements shown in FIGS. 1, 2 and 3 operate such that the B.O.-type converter oscillates independent of the output voltage or output current if the base of transistor 2 is connected to terminal B, that is, to reference potential, via the decoupling diode 33. Neglecting the forward voltages of the diodes 31 and 32, the voltage applied to capacitor 12 is equal to the terminal voltage of the storage battery 61. If the base of transistor 2 is connected to the positive terminal (terminal A) of capacitor 12 through the decoupling diode 33, transistor 2 becomes conducting, thereby deactivating the B.O.-type converter. In consequence, the voltage at capacitor 12 and, in proportion, the base voltage of transistor 2 will then drop in accordance with the capacitor discharge time constant. If the base voltage drops below the value at which transistor 2 conducts, it will be turned off, activating again the B.O.-type converter. As a result, the voltage at capacitor 12 will increase until transistor 2 becomes again conducting, deactivating again the B.O.-type converter.

This process will be cyclically repeated. The arithmetical mean of the base voltage of transistor 2 equals the base-emitter voltage at which this transistor conducts (0.6 V, approximately). The arithmetical mean of the voltage at capacitor 12 is proportional to the base voltage. Since the discharge time constant of capacitor 12 is large, the intervals elapsing between the individual charging current pulses of this capacitor are correspondingly long, resulting in a very small arithmetical mean of this current and of the charging current of the storage battery 61. Accordingly, the pulse/no-pulse ratio of the battery charging current corresponds to that of the capacitor charging current.

Since the switching arrangement 7 which is generally an electronic switch requiring an operating voltage receives this operating voltage from the capacitor 12 and not from the storage battery 61, it operates only when the switching power supply is connected to the supply voltage. If the switching power supply is disconnected from the supply voltage, the voltage at capacitor 12 becomes zero. In view of the absence of an electrical connection between the switching arrangement 7 and the storage battery 61, the storage battery cannot be discharged.

Accordingly, the switching arrangement 7 does not consume energy when the switching power supply is disconnected from the supply voltage, and switching of the output current of the B.O.-type converter is accomplished without loss.

By analogy, other switching arrangements 7 considering the charging characteristics as, for example, the variation of the cell pressure of a storage battery as reflected in the characteristic curve 4c of FIG. 4 can be manufactured and used for the electronic switching power supply of FIG. 1.

Thus, the switching arrangement 7 can be configured such as to switch the switching power supply from a high boost-charge current to a low trickle-charge current and vice versa in dependence upon the cell voltage, the cell temperature or the internal gas pressure of the storage battery.

I claim:

1. An electronic switching power supply for charging a storage battery or accumulator (61) from an AC or DC voltage source of different voltage levels, including a primary-pulsed blocking oscillator type converter in which the primary coil (51) of a transformer (5) is connected in series with a first transistor (1) while its secondary coil (52) is connected in series with the storage battery (61) and a first diode (31), with the base of the first transistor (1) being connected, via a first capacitor (11) and a first resistor (21) connected in series, both to the one end of the secondary coil (52) of the transformer (5), while the other coil end is connected to the storage battery (61), and, via a second resistor (22), to the one terminal of the input voltage source and to the collector of a second transistor (2) having its emitter connected to reference potential, with the emitter of the first transistor (1) being connected both to reference potential via a third resistor (23) and, via a zener diode (41), to the base of the second transistor (2) connected to reference potential via a fourth resistor (24), characterized in that a second capacitor (12) in series with a rectifier (32) are provided in parallel with the secondary coil (52) of the transformer (5), their junction being connected to reference potential, and in that a switching arrangement (7) is provided in parallel with the second capacitor (12), said switching arrangement connecting either the terminal (A) of the second capacitor (12) connected to the secondary coil (52) of the transformer or the terminal (B) of the second capacitor (12) connected to reference potential with the base of the second transistor (2) via a decoupling arrangement.

2. An electronic switching power supply as claimed in claim 1, characterized in that the switching arrangement (7) connectes the decoupling arrangement to reference potential with the switching power supply turned off.

3. An electronic switching power supply as claimed in claim 2, characterized in that the decoupling arrangement is comprised of a fifth resistor (25) and a third diode (33) connected in series.

4. An electronic switching power supply as claimed in claim 1, 2 or 3, characterized in that the switching arrangement (7) is comprised of an auxiliary voltage circuit to which the battery voltage is applied and which operates in dependence on the charging characteristics of the storage battery (61) when the storage battery (61) has reached its fully charged condition.

5. An electronic switching power supply as claimed in claim 4, characterized in that the switching arrangement (7) is comprised of a comparator (71) having its positive input connected to the one terminal of the storage battery (61) and its negative input to the other terminal of the storage battery (61) via a third capacitor (73) as well as to its output via a fourth diode (72), with the output of the comparator (71) driving via a third transistor (74) the base of a fourth transistor (89) whose main circuit path runs parallel with the second capacitor (12).

6. An electronic switching power supply as claimed in claim 1, 2 or 3, characterized in that the switching arrangement (7) is comprised of a self-holding thermal circuit breaker responsive to the cell temperature of the storage battery (61) and switching in dependence on the charging characteristics of the storage battery (61) when it has reached its fully charged condition.

7. An electronic switching power supply as claimed in claim 6, characterized in that the self-holding thermal circuit breaker is comprised of a comparator (80) having at its positive input the voltage applied to the second capacitor (12) and at its negative input the voltage drop across a thermally sensitive resistor (84) which is thermally connected to the storage battery (61), while its output drives the base of a fourth transistor (89) connected in parallel with the second capacitor (12).

8. An electronic switching power supply as claimed in claim 7, characterized in that the self-holding thermal circuit breaker includes two voltage dividers connected in parallel with the second capacitor (12), the first voltage divider thereof being comprised of a first voltage-dividing resistor (81) in series with the thermally sensitive resistor (84) having their junction connected to the negative input of the comparator (80), and the second voltage divider thereof being comprised of a second voltage-dividing resistor (82) in series with a third voltage-dividing resistor (83) having their junction connected to the positive input of the comparator (80), that the output of the comparator (80) is fed back to the positive input of the comparator (80) via a diode (88) and a resistor (85), that a capacitor (86) is connected in parallel with the third voltage-dividing resistor (83), and that the output of the comparator (80) is connected to the base of the fourth transistor (89) whose collector is connected to the terminal of the second capacitor (12) connected to the secondary coil (52) of the transformer (5) and whose emitter is connected to reference potential via a resistor (90) and to the decoupling arrangement.

* * * * *